(12) United States Patent
Berg et al.

(10) Patent No.: US 10,792,589 B2
(45) Date of Patent: Oct. 6, 2020

(54) GAS LIQUID SEPARATOR FOR CHROMATOGRAPHY APPLICATIONS

(71) Applicant: Waters Technologies Corporation, Milford, MA (US)

(72) Inventors: Emily J. Berg, Douglas, MA (US); Joshua A. Shreve, Franklin, MA (US); Edwin H. Denecke, North Attleboro, MA (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 291 days.

(21) Appl. No.: 15/791,622

(22) Filed: Oct. 24, 2017

(65) Prior Publication Data
US 2018/0111060 A1   Apr. 26, 2018

Related U.S. Application Data

(60) Provisional application No. 62/412,454, filed on Oct. 25, 2016.

(51) Int. Cl.
*B01D 15/40* (2006.01)
*B01D 15/16* (2006.01)
(Continued)

(52) U.S. Cl.
CPC ............. *B01D 15/40* (2013.01); *B01D 15/10* (2013.01); *B01D 15/161* (2013.01);
(Continued)

(58) Field of Classification Search
CPC combination set(s) only.
See application file for complete search history.

(56) References Cited

U.S. PATENT DOCUMENTS

2007/0190370 A1*  8/2007  Jang ................... B01D 19/0031
                                                           429/410
2012/0285322 A1* 11/2012  Halpap ..................... B04C 5/04
                                                            55/459.1
(Continued)

FOREIGN PATENT DOCUMENTS

CH           306987 A      5/1955
GB           931735 A      7/1963
(Continued)

OTHER PUBLICATIONS

International Preliminary Report on Patentability in PCT/US2017/057978 dated May 9, 2019; 11 pages.
(Continued)

*Primary Examiner* — Ryan B Huang
(74) *Attorney, Agent, or Firm* — Schmeiser, Olsen & Watts LLP; William G. Guerin (57) ABSTRACT

Examples of gas liquid separators include a chamber, a fluid mixture inlet, a gas outlet and a liquid outlet. The fluid mixture inlet and the gas and liquid outlets are in fluid communication with the chamber. A fluid mixture received at the fluid mixture inlet diffuses inside the chamber and is separated into a liquid and a gas. The separated liquid is gravity-fed to the liquid outlet. The gas liquid separators have reduced dispersion and increased liquid recovery in comparison to conventional gas liquid separators used for chromatographic separations. The reduced dispersion yields an improvement in the shape of chromatographic peaks.

7 Claims, 8 Drawing Sheets

(51) Int. Cl.
  *B01D 19/00* (2006.01)
  *B01D 15/10* (2006.01)
  *G01N 30/84* (2006.01)

(52) U.S. Cl.
  CPC ....... *B01D 15/163* (2013.01); *B01D 19/0005* (2013.01); *B01D 19/0042* (2013.01); *B01D 19/0057* (2013.01); *B01D 19/0063* (2013.01); *B01D 19/0021* (2013.01); *B01D 2257/504* (2013.01); *G01N 30/84* (2013.01)

(56) References Cited

U.S. PATENT DOCUMENTS

| | | | | |
|---|---|---|---|---|
| 2014/0190890 A1* | 7/2014 | Sidhu | ............ | G01N 30/82 210/656 |
| 2015/0174508 A1* | 6/2015 | Bozic | ............ | B01D 19/0057 210/188 |

FOREIGN PATENT DOCUMENTS

| | | |
|---|---|---|
| WO | 2010056313 A1 | 5/2010 |
| WO | 2012167180 A2 | 12/2012 |
| WO | 2014012962 A1 | 1/2014 |

OTHER PUBLICATIONS

Saito, Muneo "History of supercritical fluid chromatography: Instrumental Development," Journal of Bioscience and Bioengineering, Jan. 11, 2013, pp. 590-599, vol. 115, No. 6.

Berger, C. and M. Perrut, "Preparative supercritical fluid chromatography," Journal of Chromatography, Apr. 25, 1990, pp. 37-43, vol. 505, No. 1.

Invitation to Pay Additional Fees in International Patent Application No. PCT/US17/57978, dated Jan. 23, 2018; 15 pages.

International Search Report & Written Opinion in PCT/US17/57978, dated Mar. 19, 2018; 20 pages.

* cited by examiner

GAS LIQUID SEPARATOR FOR CHROMATOGRAPHY APPLICATIONS

RELATED APPLICATION

This application claims priority to U.S. Provisional Application No. 62/412,454 filed Oct. 25, 2016 and titled "Gas Liquid Separator and Associated Systems and Methods," the entirety of which is incorporated by reference herein.

FIELD OF THE INVENTION

The disclosure relates generally to gas liquid separators. More particularly, the disclosure relates to gas liquid separators that are suitable for chromatography systems using highly compressible fluids, such as supercritical and near-supercritical fluids.

BACKGROUND

Chromatographic techniques are important tools for the identification and separation of complex samples. The basic principle underlying chromatographic techniques is the separation of a mixture into individual components by transporting the mixture in a moving fluid through a retentive media. The moving fluid is typically referred to as the mobile phase and the retentive media is typically referred to as the stationary phase. The separation of the various components of the mixture is based on differential partitioning between the mobile and stationary phases. Differences in the partition coefficients for the various components result in differential retention on the stationary phase, resulting in separation.

Conventionally, the methods of choice for chromatographic separations have been gas chromatography (GC) and liquid chromatography (LC). The mobile phase for GC is a gas, whereas the mobile phase for LC is a liquid. For example, in GC, a supply of an inert carrier gas (mobile phase) is continually passed as a stream through a heated chromatographic column containing porous sorptive media (stationary phase). A sample of the subject mixture is injected into the mobile phase stream and passed through the column, where separation of the mixture is primarily due to the differences in the volatile characteristics of each sample component at the temperature of the column. A detector positioned at the outlet end of the column detects each of the separated components as they exit the column. Although GC is typically a sensitive method of analysis, the high temperatures required for GC make this method unsuitable for high molecular weight biopolymers or proteins (e.g., heat can denature them), frequently encountered in biochemistry.

Conversely, LC is a separation technique in which the mobile phase is a liquid and does not require volatilization of the sample. LC that generally utilizes small packing particles and moderately high pressure is referred to as high-performance liquid chromatography (HPLC); whereas LC that generally utilizes very small packing particles and high pressure is referred to as ultra-high performance liquid chromatography or ultra-high pressure liquid chromatography (UHPLC). In HPLC and UHPLC the sample is forced by a liquid at high pressure (the mobile phase) through a column that is packed with a stationary phase composed of, for example, irregularly or spherically shaped particles, a porous monolithic layer or a porous membrane.

LC uses liquid as the mobile phase therefore LC techniques can be used to analyze higher molecular weight compounds. For example, LC can be used to prepare large scale batches of purified protein(s). In contrast, GC techniques are typically more sensitive. For example, GC can be used for the separation of single chiral materials, such as to isolate and determine the relative purity of a chiral compound by determining the enantiomeric excess (% ee) or the diastereomeric excess (% de) of a particular chiral compound. As with most chromatographic techniques, the limiting factor in both GC and LC has been the ability to obtain and/or reproduce pure sample separations, each of which are typically dependent on the apparatus, methods, and conditions employed, e.g., flow rate, column size, column packing material, solvent gradient, and the like.

Figure 1:
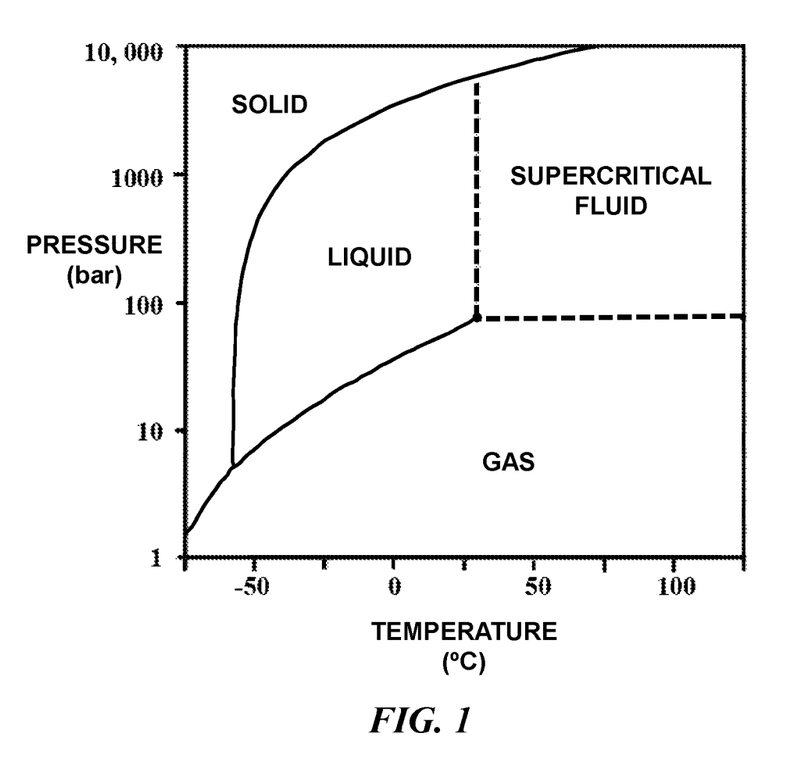
FIG. 1 is an exemplary graph of the physical state of a substance according to a temperature and pressure of the substance.

Supercritical fluid chromatography (SFC) is another chromatographic technique and uses a supercritical or near supercritical fluid as the mobile phase. For every liquid substance there is a temperature above which the substance can no longer exist as a liquid regardless of how much pressure is applied. Likewise, there is a pressure above which the substance cannot exist as a gas regardless of how much the temperature is increased. These levels are called the supercritical temperature and supercritical pressure, and define the boundaries on a phase diagram for a pure substance as shown, for example, in FIG. 1. At these levels, the liquid and vapor have the same density and the fluid cannot be liquefied by increasing the pressure. Above these levels, where no phase change occurs, the substance acts as a supercritical fluid (SF). Thus, a SF can be described as a fluid obtained by heating above the critical temperature and compressing above the critical pressure. There is a continuous transition from liquid to SF by increasing temperature at constant pressure or from gas to SF by increasing pressure at constant temperature.

The term SFC does not require or mean that supercritical conditions are obtained during or maintained throughout the separation. That is, columns do not have to be always operated in the critical region of the mobile phase. For example, if the fluid is pure carbon dioxide ($CO_2$), the fluid may be in a supercritical state somewhere in the chromatography system; however, as a modifier such as methanol or ethanol is added to the $CO_2$, the solvent mixture may be liquid at some times and at one or more locations in the system. Thus, it will be understood that a fluid which is supercritical while flowing through the chromatographic column may be liquid or gaseous at other locations in the SFC system. Moreover, the fluid state may change as the relative amount of modifier changes according to a gradient composition.

The use of $CO_2$ for a mobile phase allows for SFC processes to be inexpensive, innocuous, eco-friendly and non-toxic. There is typically no need for the use of volatile solvents (e.g., hexane). The mobile phase in SFC processes (e.g., $CO_2$ together with any modifier/additive as a SF, highly compressed gas, or compressible liquid) typically have higher diffusion constants and lower viscosities compared to liquid solvents used in LC, HPLC, and UHPLC processes. The lower viscosity means that the pressure drop across the column for a given flow rate is substantially reduced. The increased diffusivity allows a longer column length to be used.

In some SFC systems after the sample components undergo chromatographic separation, it is desirable to collect these separated fractions into open receptacles such as vials. Once the mobile phase is exposed to atmospheric pressure, the mobile phase expands and aerosolizes any analyte (fraction) and solvent present in the mobile phase. This decompression causes the velocity of the mobile phase to increase significantly and makes fraction collection difficult to perform. Prior to collection, a gas liquid separator (GLS) can be used to reduce the velocity of the effluent from the chromatographic system while effectively and efficiently separating the gas (e.g., gaseous $CO_2$) from the liquid mixture of analyte and solvent. Because the analytes pass through the GLS, the shape of the corresponding chromatographic peaks may be distorted and the efficiency of analyte recovery degraded. In conventional GLS devices, liquid can dissolve into the gas stream and exit the GLS through the gas outlet, resulting in a decreased liquid recovery.

SUMMARY

Embodiments of the present disclosure include gas liquid separators and methods of separating a gas and a liquid from a fluid mixture.

In one example, a gas liquid separator includes a chamber, a fluid mixture inlet, a gas outlet and a liquid outlet. The chamber has a chamber wall, an inlet end, an outlet end and a chamber cross-section that increases along an axial direction defined between the inlet and outlet ends. The chamber wall includes a surface at a bottom of the chamber that slopes downward from the inlet end to the outlet end to conduct a gravity flow of a liquid to the outlet end. The fluid mixture inlet is in fluid communication with the chamber and disposed proximate to the inlet end of the chamber to receive a flow of a fluid mixture. The gas outlet is in fluid communication with the chamber and disposed proximate to the outlet end of the chamber to provide a flow of a gas separated from the fluid mixture. The liquid outlet is in fluid communication with the chamber and disposed proximate to the outlet end of the chamber to provide a flow of the liquid separated from the fluid mixture.

The gas liquid separator may include a channel disposed along at least a portion of the surface at the bottom of the chamber to conduct the liquid to the liquid outlet. The channel may include a bend along a surface of the chamber wall. The chamber wall may include a proximal end plate, a distal end plate and a side wall that extends between the proximal and distal end plates and the channel may be on the side wall. The side wall may be formed of sheet metal.

The chamber may be shaped as a truncated cone. The shape of the chamber cross-section may be a parallelogram or a circle.

In another example, a gas liquid separator includes a separator body, a fluid mixture inlet, a gas outlet and a liquid outlet. The separator body has a chamber defined by an arcuate wall, a first impact wall having a first end abutting one end of the arcuate wall, a second impact wall having a first end abutting an opposite end of the arcuate wall, and a liquid channel having a first end and a second end. The first end of the liquid channel is disposed between a second end of the first impact wall and a second end of the second impact wall. The fluid mixture inlet is disposed on the separator body and is in fluid communication with the chamber through the arcuate wall. The fluid mixture inlet is configured to introduce a flow of a fluid mixture to the chamber. The gas outlet is disposed on the separator body and is in fluid communication with the chamber to provide a flow of a gas separated from the fluid mixture. The liquid outlet is disposed on the separator body at the second end of the liquid channel and is in fluid communication with the chamber to provide a flow of a liquid separated from the fluid mixture.

The separator body may further include a pair of side walls that further define the chamber. Each of the side walls may be orthogonal to the arcuate wall and the first and second impact walls. The gas outlet may be in fluid communication with the chamber through one of the side walls. The arcuate wall may include a section of a cylindrical wall.

In one example, a method of separation of a gas and a liquid from a fluid mixture includes providing a fluid mixture to a fluid mixture inlet of a gas liquid separator. The gas liquid separator includes a chamber having a chamber wall, an inlet end, an outlet end and a chamber cross-section that increases along an axial direction defined between the inlet and outlet ends. The chamber wall includes a surface at a bottom of the chamber that slopes downward from the inlet end to the outlet end to conduct a gravity flow of a liquid to the outlet end. The gas liquid separator further includes the fluid mixture inlet in fluid communication with the chamber and disposed proximate to the inlet end of the chamber to receive a flow of a fluid mixture, a gas outlet in fluid communication with the chamber and disposed proximate to the outlet end of the chamber to provide a flow of a gas separated from the fluid mixture, and a liquid outlet in fluid communication with the chamber and disposed proximate to the outlet end of the chamber to provide a flow of the liquid separated from the fluid mixture. The method further includes discharging the liquid from the liquid outlet after separation of the liquid from the fluid mixture and discharging the gas from the gas outlet after separation of the gas from the fluid mixture.

The gas may include carbon dioxide. The liquid may include a sample component or a modifier.

The step of providing the fluid mixture to the fluid mixture inlet may include providing an eluent of a chromatography system to the fluid mixture inlet.

In one example, a method of separating a gas and a liquid from a fluid mixture includes providing a fluid mixture to a fluid mixture inlet of a gas liquid separator. The gas liquid separator includes a separator body having a chamber defined by an arcuate wall, a first impact wall having a first end abutting one end of the arcuate wall and a second impact wall having a first end abutting an opposite end of the arcuate wall. The separator body further includes a liquid channel having a first end and a second end, where the first end is disposed between a second end of the first impact wall and a second end of the second impact wall. The gas liquid separator further includes a fluid mixture inlet disposed on the separator body. The fluid mixture inlet is in fluid communication with the chamber through the arcuate wall and is configured to introduce a flow of a fluid mixture to the chamber. The gas liquid separator further includes a gas outlet disposed on the separator body and in fluid communication with the chamber to provide a flow of a gas separated from the fluid mixture, and a liquid outlet disposed on the separator body and in fluid communication with the chamber through the liquid channel to provide a flow of a liquid separated from the fluid mixture. The method further includes discharging the liquid from the liquid outlet after separation of the liquid from the fluid mixture and discharging the gas from the gas outlet after separation of the gas from the fluid mixture.

The gas may include carbon dioxide. The liquid may include a sample component or a modifier.

The step of providing the fluid mixture to the fluid mixture inlet may include providing an eluent of a chromatography system to the fluid mixture inlet.

BRIEF DESCRIPTION OF THE DRAWINGS

The above and further advantages of this invention may be better understood by referring to the following description in conjunction with the accompanying drawings, in which like reference numerals indicate like elements and features in the various figures. It is to be understood that terms such as above, below, upper, lower, left, leftmost, right, rightmost, top, bottom, front, and rear are relative terms used for purposes of simplifying the description of features as shown in the figures, and are not used to impose any limitation on the structure or use of embodiments described herein. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

SFC systems such as $CO_2$-based chromatography systems can be adapted as a hybrid between HPLC and GC apparatuses, where the predominant modification is replacement of either the liquid or gas mobile phase with a supercritical fluid (or near supercritical fluid) mobile phase, such as with $CO_2$. In SFC or in some $CO_2$-based chromatography systems (which utilize SFs), the mobile phase is initially pumped as a liquid and is brought into the supercritical region by heating and pressurizing the mobile phase above its supercritical temperature/pressure prior to entry into a column. As the mobile phase passes through an injection valve, the sample is introduced into the supercritical stream, and the fluid mixture is then transferred to a column. The fluid mixture passes through the column (at supercritical or liquid state) and then into a GLS where the $CO_2$ gas and the liquid are separated. The $CO_2$ gas is discharged from a gas outlet and the liquid is discharged from a liquid outlet that is in fluid communication with a detector or collector.

In general, the mobile phase in SFC or $CO_2$-based chromatography system processes has the ability to act both as a substance carrier (like the mobile phases in GC), and dissolve substances readily (like the solvents used in LC). In addition to generally having lower viscosities and better diffusion profiles similar to those of certain gases, the mobile phases in SFC or $CO_2$-based chromatography system processes also generally have high densities and dissolving capacities similar to those of certain liquids. For example, the high densities (0.2-0.5 gm/cm3) of SFs provide for their remarkable ability to dissolve large, non-volatile molecules, e.g., supercritical or near supercritical $CO_2$ readily dissolves n-alkanes, di-n-alkyl phthalates, and polycyclic and aromatic compounds. $CO_2$ under pressures and temperatures used in chromatographic processes also possess similarly high densities and dissolving capacities. Since the diffusion of solutes in a SFC or $CO_2$-based chromatography system mobile phase is about ten times greater than that in liquids (about three times less than in gases), a decrease in resistance to mass transfer in the column occurs and allows for fast high resolution separation. Also, the solvation strength of the mobile phase in SFC or $CO_2$-based chromatography system processes is directly related to the fluid density. Thus, the solubility of solids can be easily manipulated by making slight changes in temperatures and pressures.

Another important property of the mobile phase in SFC or $CO_2$-based chromatography system processes is that it provides high resolution chromatography at much lower temperatures. For example, an analyte dissolved in $CO_2$ can be recovered by reducing the pressure and allowing the sample to evaporate under ambient laboratory conditions. This property is useful when dealing that with thermally unstable analytes, such as high molecular weight biopolymers or proteins.

Conventional GLSs often include mechanisms that aid in particle separation according to various techniques such as inertial impaction (e.g., centrifugal impaction) and direct interception onto a surface. Some centrifugal impaction devices are in the form of vertical cylinders where a fluid mixture is introduced tangentially into a cylindrical chamber near or at the top of the chamber so that the liquid falls from the gas as the mixture cyclones down the cylinder. Centrifugal techniques can be problematic for high flow rate SFC applications (e.g., 10 mL/min to 300 mL/min) such as preparatory scale SFC applications. Liquid recovery yields are typically low across a wide range of $CO_2$ flow rates because the gas does not sufficiently decelerate, resulting in re-entrainment of the liquid back into the gas stream. Another disadvantage is the fluid path that leads to the liquid outlet. As liquid separates from the gas, the liquid may mist radially outward onto the cylinder wall and not follow a definite path to the liquid outlet. This inability to maintain a continuous path to the liquid outlet leads to dispersion and distortion of the sample peaks corresponding to the sample components. Direct interception techniques also pose disadvantages because the impact of the fluid mixture onto a surface can degrade the integrity of the analyte to be collected.

In brief overview, embodiments disclosed herein are directed to GLSs having a chamber in which a gas and a liquid are separated from a fluid mixture (e.g., a mixture of $CO_2$ and one or more solvents) received at a fluid mixture inlet. The gas is provided at a gas outlet after separation of the gas from the fluid mixture. The liquid is provided at a liquid outlet after separation of the liquid from the fluid mixture. Advantageously, the chamber configurations in various embodiments, including embodiments in which the fluid mixture diffuses inside the chamber and the separated liquid is gravity-fed to the liquid outlet, significantly reduces fluid dispersion and increases recovery. Thus, such GLSs, when used in SFC systems, can reduce the distortion of chromatographic peaks and increase the total collected liquid.

Figure 2:
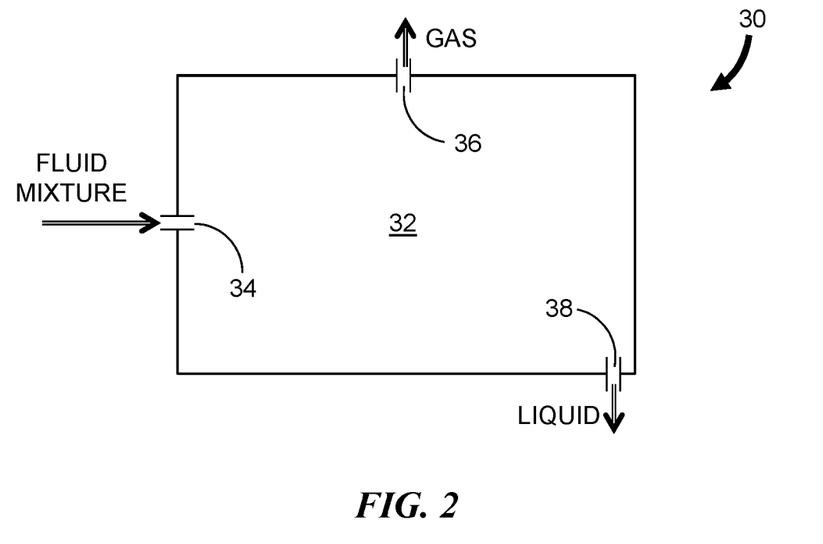
FIG. 2 is a diagrammatic view of a GLS 30 that may be used in a SFC system.

FIG. 2 is a diagrammatic view of a GLS 30 that may be used in a SFC system. The GLS includes a chamber 32 in fluid communication with a fluid mixture inlet 34, a gas outlet 36 and a liquid outlet 38. A fluid mixture introduced into the chamber 32 through the fluid mixture inlet 34 is separated, at least partially, into a gas and a liquid. The fluid mixture includes a combination of two or more fluids. For example, the fluid mixture can include $CO_2$, a solvent, a modifier and a sample. The efficiency of the liquid separation is defined as the amount of liquid exiting the chamber 32 through the liquid outlet 38 relative to the amount of liquid present in the fluid mixture at the fluid mixture inlet 34.

The fluid mixture can be delivered to the GLS through tubing. Preferably, the inner diameter of the tubing coupled to the gas outlet 36 is substantially greater than the inner diameter of the tubing coupled to the fluid mixture inlet 34 and the liquid outlet 38 to minimize the restriction on the discharged gas.

The expansion of the fluid mixture as it decompresses upon entry into the chamber 32 results in a substantial change in density in transitioning from a SF, or near-supercritical fluid, to gas. As a result, the velocity of the fluid mixture upon entry into the chamber 32 increases significantly. Embodiments described below significantly reduce the velocity of the fluid mixture after entry into the chamber 32 and allow for a more efficient separation of gas and liquid from the fluid mixture than conventional GLSs.

Figures 3A, 3B:
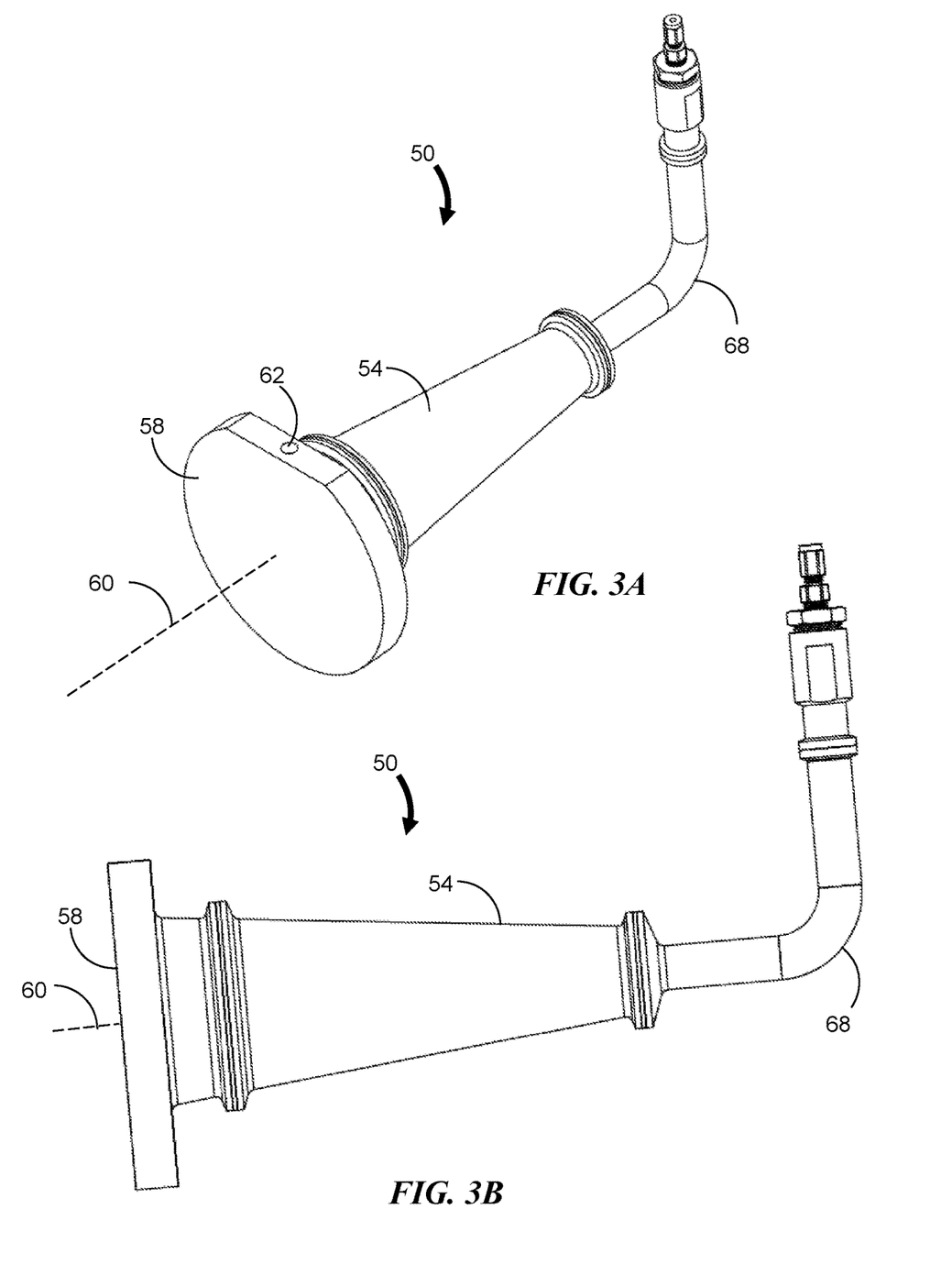
FIGS. 3A, 3B and 3C are a perspective view, side view and cross-sectional side view, respectively, of one example of a GLS having a conical chamber wall.
Figure 3C:
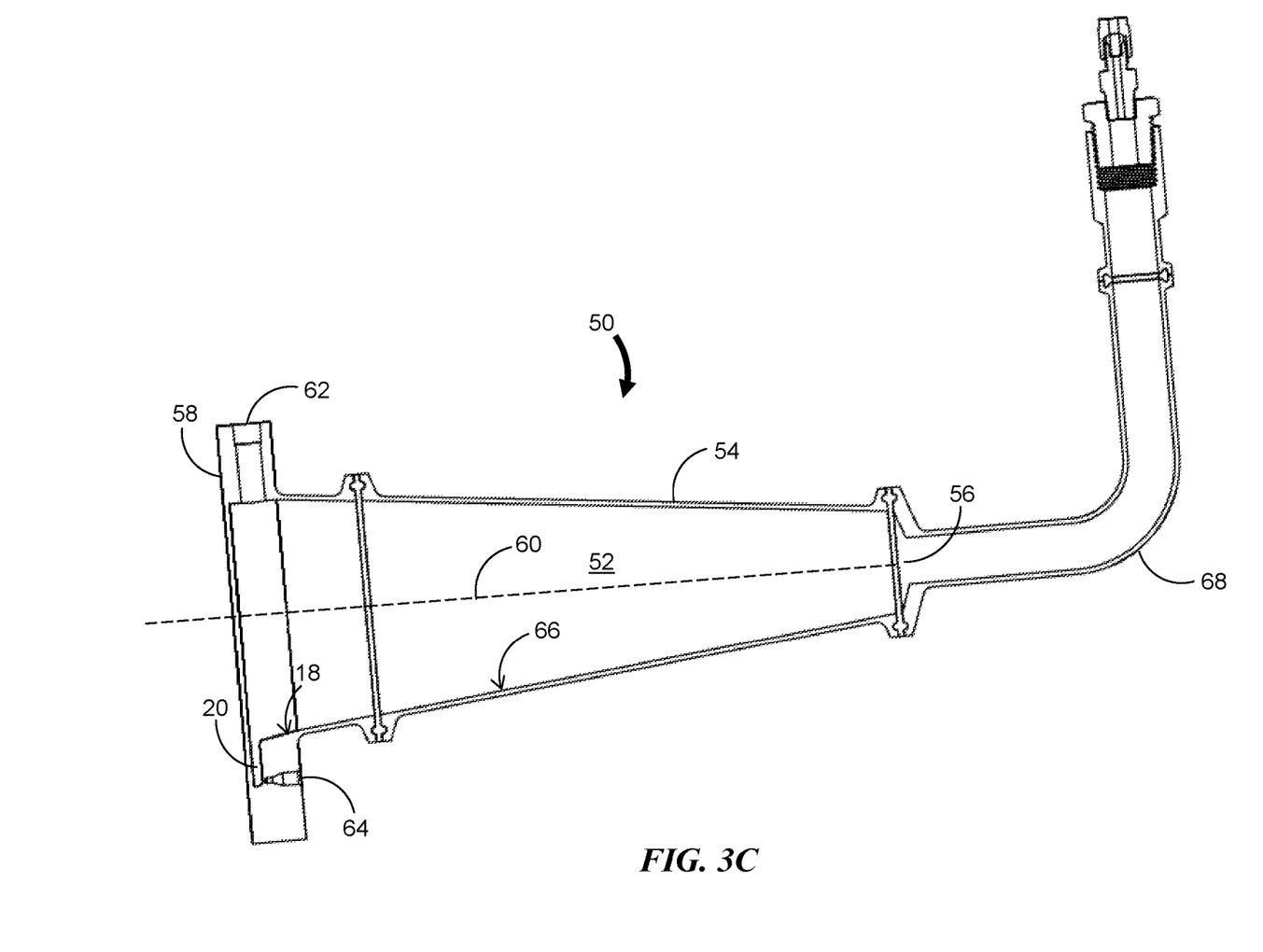

FIGS. 3A, 3B and 3C are a perspective view, side view and cross-sectional side view, respectively, of one embodiment of a GLS 50. The GLS 50 includes a chamber 52 substantially enclosed by a chamber wall. As used herein, a chamber wall includes all wall sections that define and substantially surround a chamber volume. The chamber wall is preferably fabricated from materials that are biologically inert and which are chemically compatible with the solvents used with the SFC system. In some systems, the chamber 52 is constructed to accommodate pressures that may exceed 7 MPa (1,000 psi). For example, the chamber wall and other components of the GLS may be fabricated with stainless steel or titanium. In the illustrated embodiment, the chamber wall includes a wall 54 having a truncated conical shape that extends between a fluid mixture inlet 56 at an inlet end of the chamber 52 and an end plate 58 at the outlet end of the chamber 52 adjacent to the base of the truncated cone. The chamber 52 has a circular cross-section defined along the chamber axis 60. The area of the circular cross-section increases with increasing distance from the inlet end of the chamber 52. The GLS further includes a gas outlet 62 disposed in the end plate 58 proximate to the outlet end of the chamber 52 to provide a flow of a gas separated from the fluid mixture and a liquid outlet 64 disposed in the end plate 58 to provide a flow of the liquid separated from the fluid mixture.

The fluid mixture is conducted through piping 68, including a 90° elbow, to the fluid mixture inlet 56. Advantageously, the elbow can reduce the velocity of the fluid mixture before reaching the fluid mixture inlet 56. In some embodiments, a makeup solvent may be introduced at low flow rates upstream from the fluid mixture inlet 56 as a liquid carrier to conduct, by way of a steady flow, the separated sample components through the liquid flow path to a fraction collector. In other embodiments, a co-solvent present in the mobile phase acts as the liquid carrier. The fluid mixture undergoes a phase change as it passes from the fluid mixture inlet 56 into the inlet end of the chamber 52. The aerosolized fluid mixture continues to expand as it moves further into the diffusing volume (chamber) and decelerates to a sufficiently lower velocity to allow gravity separation of the liquid fractions and any co-solvent or makeup solvent from the gas.

For a fluid mixture of $CO_2$ over a $CO_2$ flow rate range of about 40 mL/min to 120 mL/min and a constant co-solvent flow rate of 10 mL/min of methanol, liquid recovery of about 96% can be achieved. The liquid follows the conical wall profile as it moves to the liquid outlet 64 at the bottom of the outlet end of the chamber 52. A downward sloping recess 18 inside the end plate 58 receives the liquid conducted along the lower inner surface 66. The liquid then passes downward through a vertical channel 20 before being discharged at the liquid outlet 64. The liquid tends to increasingly spread upward along the circumference of the cone-shaped chamber 52 as it flows from right to left along the lower inner surface 66 of the chamber wall. This spreading can result in analyte dispersion and can lead to degradation in analyte chromatographic peak shape.

It is often desirable to control the pressure in the chamber 52 in order to maintain a constant flow rate at the liquid outlet 64, for example, to ensure a consistent flow into collection vessels for fraction collection. The height of the liquid in the vertical channel 20 may be used as a control parameter for adjusting the pressure in the chamber 52 so that the rate at which liquid is being collected in the vertical channel 20 is equal to the rate at which the liquid is discharged from the liquid outlet 64. An automated back pressure regulator may be used along the flow path (e.g., tubing) leading from the liquid outlet 64. If the liquid height increases to exceed a predetermined level, the chamber pressure may be increased by reducing the gas flow discharged from the gas outlet 62, causing an increase in the flow of liquid discharged from the chamber 52 and a reduction in the liquid height. Conversely, if the liquid height decreases to less than a predetermined level, the chamber pressure is reduced to cause a reduction in the flow of liquid discharged from the chamber 52. This technique to maintain a constant liquid flow rate may also be applied to other embodiments described below.

In the illustrated embodiment, the full cone angle is approximately 12°, although in other embodiments the cone angle may be different. For example, the cone angle can be increased or decreased to increase or decrease, respectively, the velocity of the fluid mixture entering at the inlet end of the chamber 52; however, increased velocity can lead to greater re-entrainment of separated liquid back into the flow stream and reduced liquid recovery.

Figure 4A:
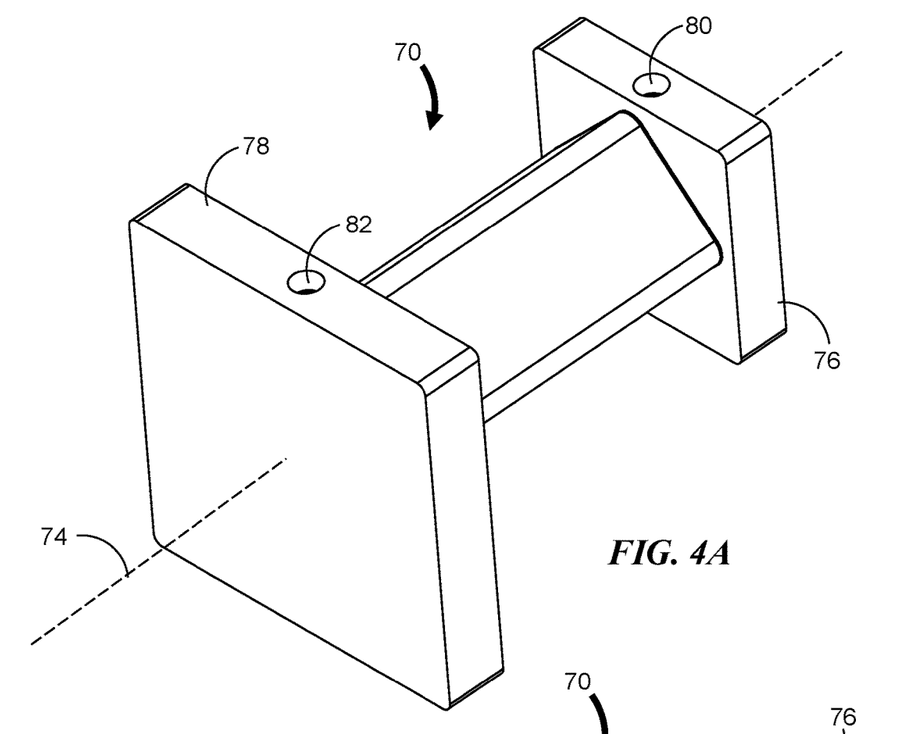
FIGS. 4A, 4B and 4C are a perspective view, side view and cross-sectional side view, respectively, of one example of a GLS having a chamber wall defining a square cross-section.
Figure 4B:
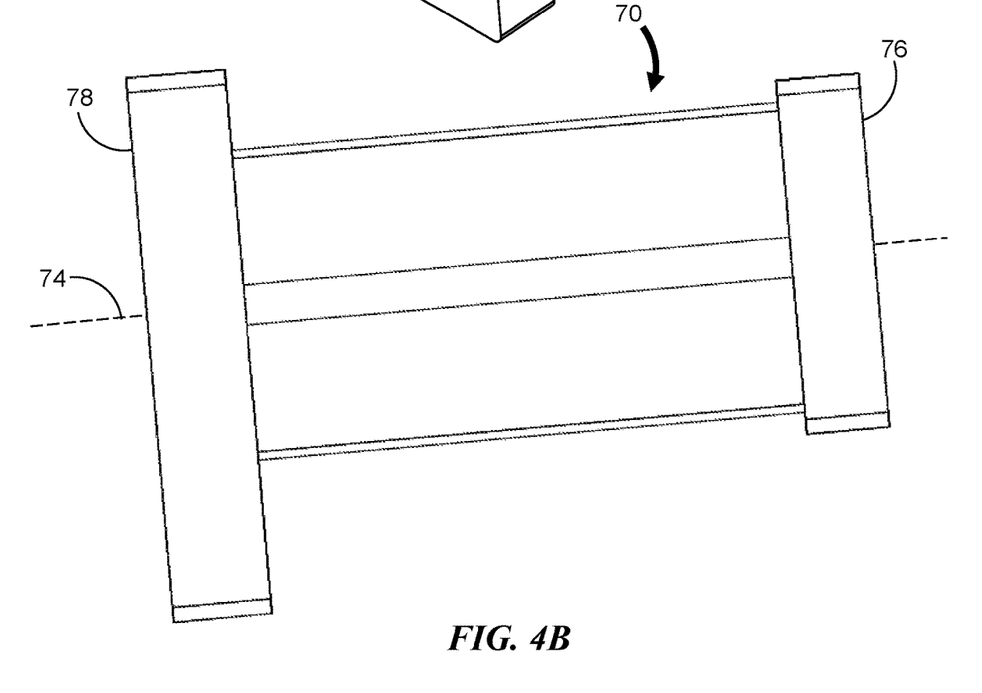
Figure 4C:
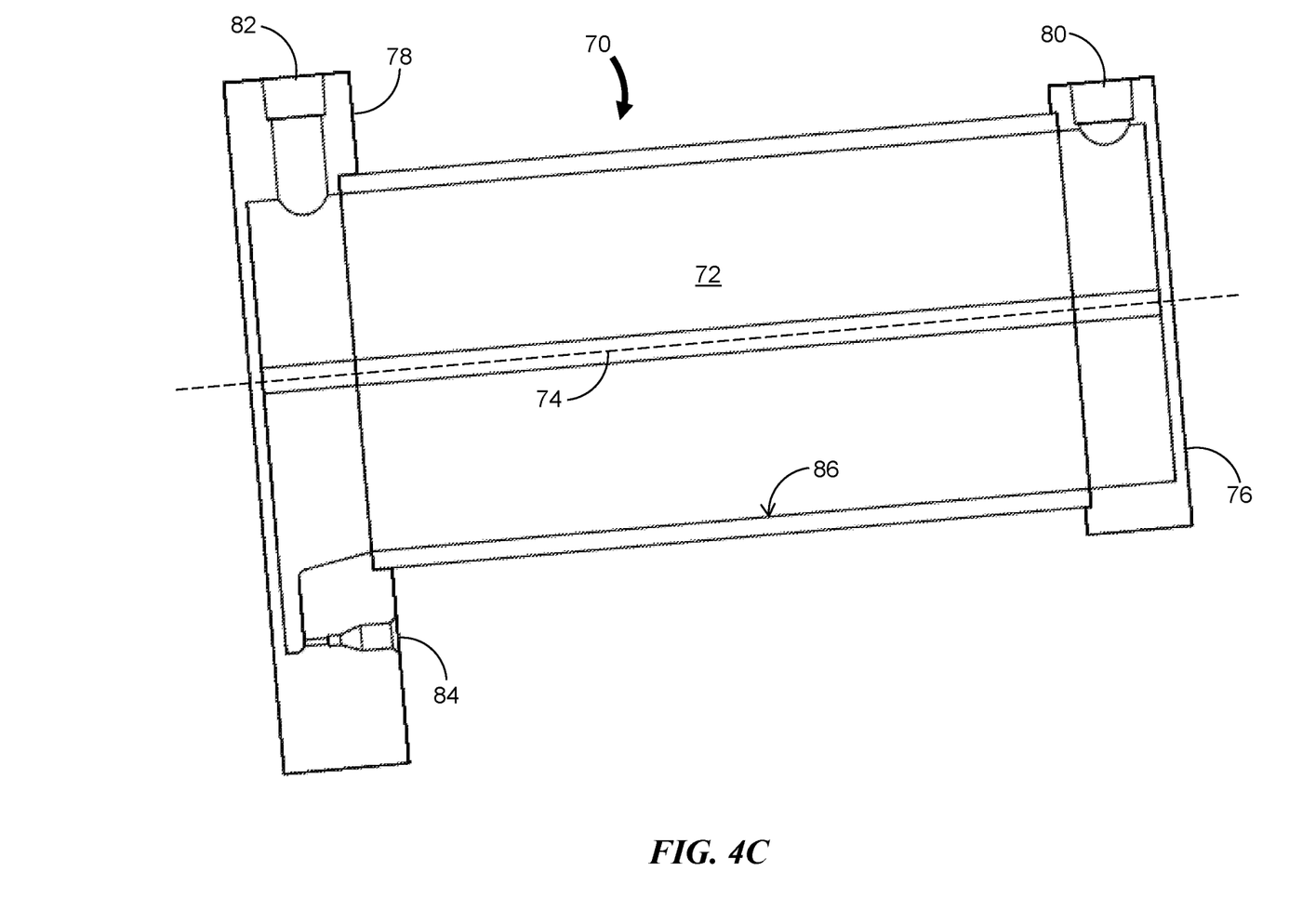

FIGS. 4A, 4B and 4C are a perspective view, side view and cross-sectional side view, respectively, of another embodiment of a GLS 70. The GLS 70 includes a chamber 72 substantially enclosed by a chamber wall. The chamber wall may be constructed from similar materials and to withstand similar pressures as described above for the GLS 50 of FIGS. 3A to 3C. In the illustrated embodiment, the chamber wall includes four side walls that define a square chamber cross-section of constant area along a chamber axis 74, although in other embodiments the side walls may be arranged to form a different parallelogram or four-sided shape. The four side walls are oriented such that each edge of a side wall meets an edge of an adjacent side wall to form a 90° angle. Two of the side walls have a common edge at the top of the chamber 72 along a line that is parallel to the chamber axis 74 and the opposite two side walls have a common edge at the bottom of the chamber 72 along another line that is parallel to the chamber axis 74 such that the cross-section has a "diamond-shape." The portion of the chamber wall having the four side walls may be a single piece of square tube stock. In alternative embodiments, the four side walls may be formed using an inexpensive sheet metal weld process to secure two or more sheet metal pieces to each other where one or more of the sheet metal pieces may be bent to create the desired shape for the cross-section.

The chamber 72 extends longitudinally along the chamber axis 74 between a proximal end plate 76 at an inlet end of the chamber 72 and a distal end plate 78 at the outlet end of the chamber 52. Each end plate 76 and 78 can be secured to the side walls by bolting to a flange (not shown) through an intervening gasket (not shown) at each end of the side wall structure or using other techniques as are known in the art. In one non-limiting numerical example, each of the four side walls is approximately 50 mm (2.0 in) wide and the length of the chamber 52 as defined by the separation of the end plates 76 and 78 is approximately 150 mm (6.0 in.).

The GLS 70 further includes a fluid mixture inlet 80 disposed in the chamber wall proximate to the inlet end of the chamber 72 to receive a flow of a fluid mixture, a gas outlet 82 disposed in the chamber wall proximate to the outlet end of the chamber 72 to provide a flow of a gas separated from the fluid mixture and a liquid outlet 84 disposed in the chamber wall proximate to the outlet end of the chamber 72 to provide a flow of the liquid separated from the fluid mixture. The fluid mixture is received at the fluid mixture inlet 80 before passing into the chamber 72 where the aerosolized fluid mixture expands within the chamber volume and decelerates to allow gravity separation of the liquid fractions from the gas.

The corner, or bend, 86 along the bottom of the chamber 72 defines a downward-sloping (right to left in the figures) sharp channel along which the liquid can flow to the liquid outlet 84. This sharp channel 86 limits the upward migration of the liquid along the side walls. In some alternative embodiments the channel is formed directly in or on a single side wall. For example, sheet metal bending techniques can be used to create the sharp bend or the channel can be created by forming a groove or channel along the inner surface of the side wall.

For a fluid mixture of $CO_2$ over a $CO_2$ flow rate range of about 40 mL/min to 120 mL/min and a constant co-solvent flow rate of 10 mL/min of methanol, liquid recovery of about 94% is achieved. When compared to the GLS 50 of FIGS. 3A to 3C, the more efficient conduction of liquid along the channel 86 leads to a reduction in analyte dispersion and improvement in analyte chromatographic peak shape. The absence of a diffusing geometry, i.e., a gradually expanding cross-section along the axis 74; however, limits the liquid recovery because the velocity of the gas within the chamber 52 may not be sufficient for a near-complete gas liquid separation.

Figure 5A:
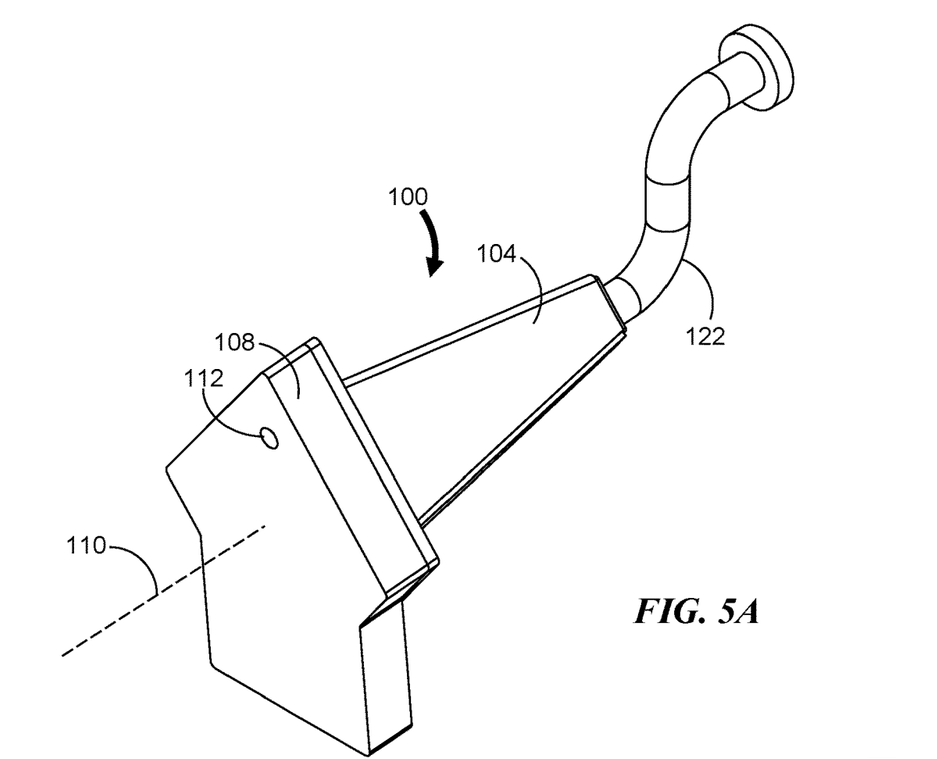
FIGS. 5A, 5B and 5C are a perspective view, side view and cross-sectional side view, respectively, of one example of a GLS having a chamber wall defining an expanding square cross-section.
Figure 5B:
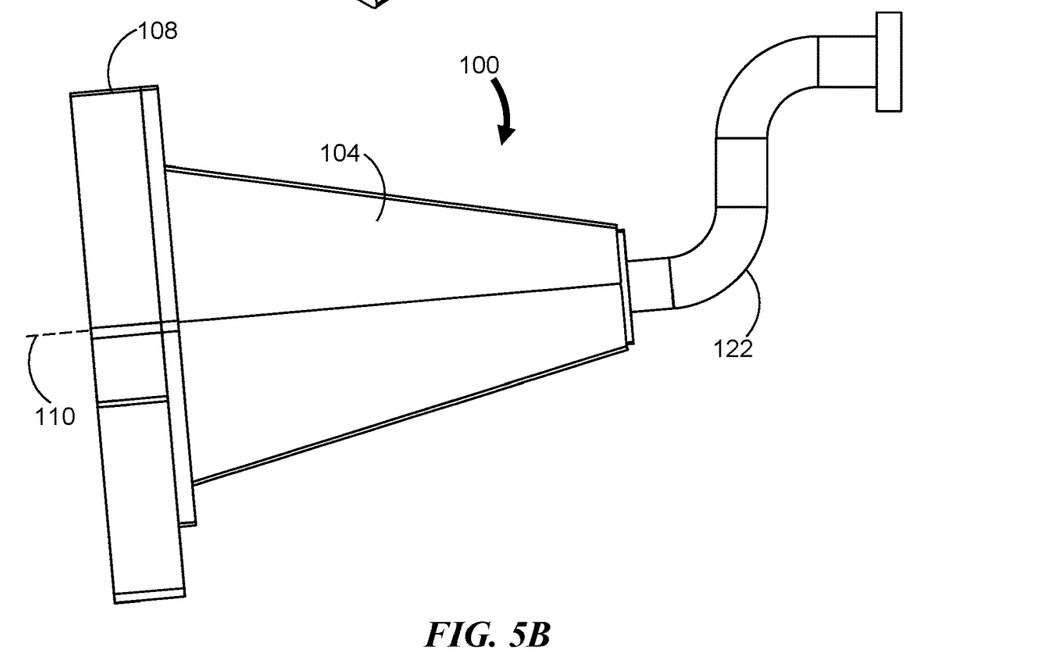
Figure 5C:
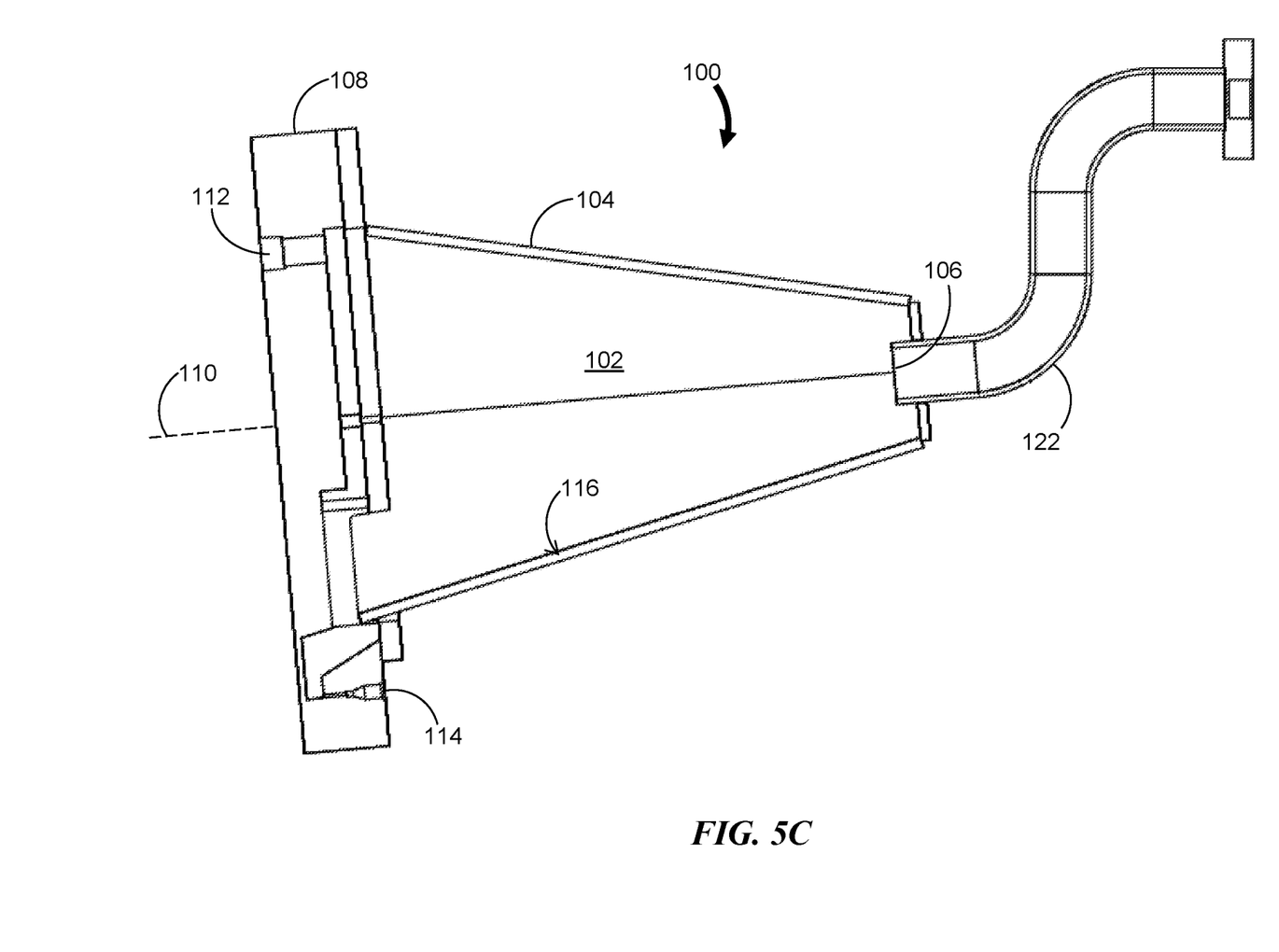

FIGS. 5A, 5B and 5C are a perspective view, side view and cross-sectional side view, respectively, of another embodiment of a GLS 100 which includes a combination of features present in the embodiments illustrated in FIGS. 3A to 4C. The GLS 100 is shown coupled to tubing 122 which provides the fluid mixture to be separated. The GLS 100 includes a chamber 102 formed of one or more side walls 104 shaped in a truncated pyramid form that extends from a fluid mixture inlet 106 at an inlet end of the chamber 102 to an end plate 108 at the outlet end of the chamber 102. This shape allows for the gradual expansion of the fluid mixture as it traverses from the inlet end toward the outlet end of the chamber. The area of the diamond-shaped cross-section increases with increasing distance along the chamber axis 110 from the inlet end of the chamber 102. The GLS further includes a gas outlet 112 disposed in the end plate 108 to provide a flow of a gas separated from the fluid mixture and a liquid outlet 114 disposed in the end plate 108 to provide a flow of the liquid separated from the fluid mixture.

The chamber 102 also includes a channel 116 along the bottom surface of the chamber wall which provides benefits similar to those obtained with the channel 86 in the GLS 70 of FIGS. 4A to 4C. In the illustrated embodiment, the channel 116 is defined along the bottom of the cross-section. The GLS 100 is oriented for operation such that the chamber axis 110 slopes downward (from right to left in the figures). This results in a steeper downward channel path. The result is an improved flow of liquid in the channel 116 due to gravity and a corresponding reduction in analyte dispersion and improvement in chromatographic peak shape.

For a fluid mixture of $CO_2$ over a $CO_2$ flow rate range of about 40 mL/min to 120 mL/min and a constant co-solvent flow rate of 10 mL/min of methanol, a liquid recovery of about 96% is achieved which is similar to the liquid recovery for the GLS of FIGS. 3A to 3C.

Various embodiments described above relate to high flow rate applications. In analytical SFC systems where low flow rates (e.g., less than 5 mL/min.) are used, fraction collection can be difficult to perform and alternatives to the above-described GLS embodiments may be preferred.

Figure 6A:
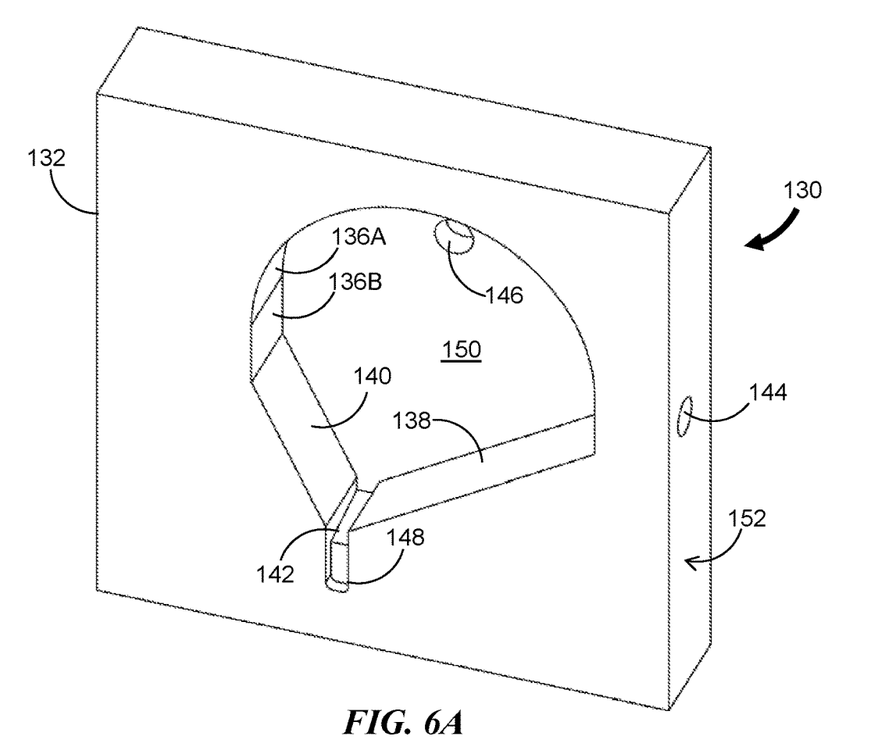
FIGS. 6A and 6B are a perspective view and a front view, respectively, of an embodiment of a GLS for low flow rate SFC systems.
Figure 6B:
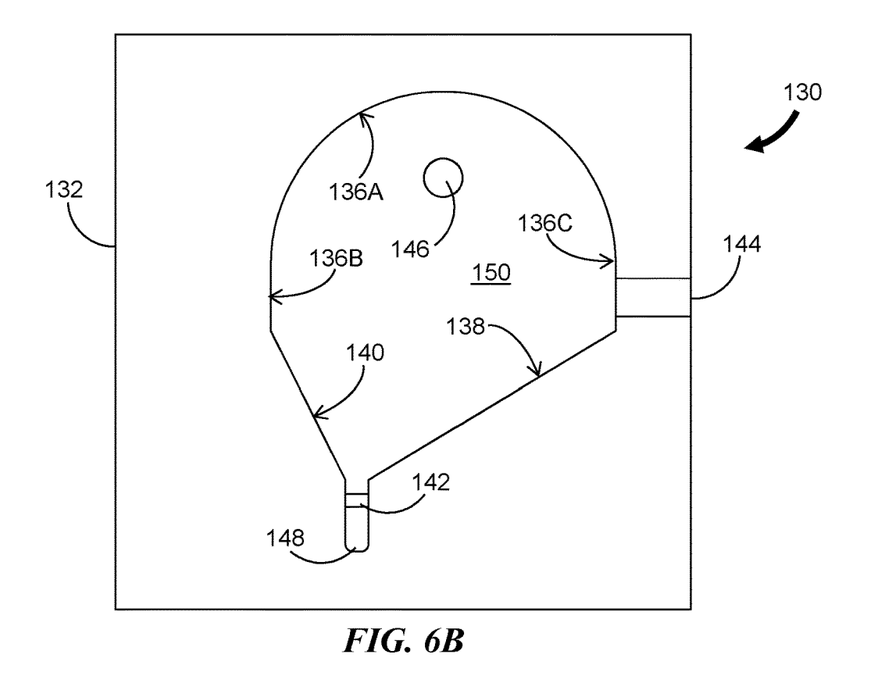

FIGS. 6A and 6B are a perspective view and a front view, respectively, of an embodiment of a GLS 130 that can be used, for example, in low flow rate SFC applications. These figures show the GLS 120 without a front plate so that various features of the remaining structure are visible.

The GLS 130 includes a separator body 132 having a chamber defined by an arcuate wall 136, a first impact wall 138 having a first end abutting one end of the arcuate wall 136, a second impact wall 140 having a first end abutting an opposite end of the arcuate wall 136, a side wall 150 (which is an integral surface of the separator body 132) and the front plate. As used herein, an arcuate wall means any wall having at least a surface portion that is curved. For example, the illustrated arcuate wall 136 includes an approximately 180° portion 136A of a cylindrical wall with shorter straight extensions 136B and 136C at the ends of the wall 136. The separator body 132 further includes a liquid channel 142 having a first end and a second end. The first end of the liquid channel 142 is located between a second end of the first impact wall 138 and a second end of the second impact wall 140. The side wall 150 and front plate are opposing side walls which are both orthogonal to the arcuate wall 136 and impact walls 138 and 140.

The GLS 130 further includes a fluid mixture inlet 144, a gas outlet 146 and a liquid outlet 148. The fluid mixture inlet 144 is located on a side 152 of the separator body 132 and is in fluid communication with the chamber through the arcuate wall 136 to enable a flow of a fluid mixture to be introduced into the chamber. The gas outlet 146 is disposed on the separator body 132 and is in fluid communication with the chamber through the side wall 150 to receive and discharge a flow of a gas that is separated from the fluid mixture. The liquid outlet 148 is disposed on the separator body 132 at the second end of the liquid channel 142 and is in fluid communication with the chamber to receive and discharge a flow of a liquid separated from the fluid mixture.

During operation, the fluid mixture passing through the fluid mixture inlet 144 enters the chamber 134 and flows along and above the first impact wall 138 toward the second impact wall 140. After impacting the second impact wall 140, the flow generally moves upward in the figure to circulate in an approximate clockwise direction with a substantially reduced velocity. The chamber shape enables the controlled diffusion of the flow from the fluid mixture inlet 144 before circulating within the chamber 134. Liquid recovery determined for the GLS 130 was determined to be approximately 89% for a $CO_2$ flow rate within a range of about 40 mL/min. to 120 mL/min. with a constant methanol co-solvent flow rate of 10 mL/min. Liquid recovery can exceed this performance at lower flow rates.

While exemplary embodiments are described herein, it should be understood by those skilled in the art that various changes in form and detail may be made therein without departing from the scope of the invention as defined by the following claims.

The invention claimed is:

1. A gas liquid separator, comprising:
   a chamber having a chamber wall, an inlet end, an outlet end and a chamber cross-section defined along a chamber axis extending between the inlet and outlet ends wherein an area of the chamber cross-section increases with increasing distance along the chamber axis from the inlet end, the chamber wall including a surface that extends from the inlet end to the outlet end;
   a fluid mixture inlet in fluid communication with the chamber and disposed at the inlet end of the chamber to receive a flow of a fluid mixture;
   a gas outlet in fluid communication with the chamber and disposed at the outlet end of the chamber to provide a flow of a gas separated from the fluid mixture;
   a liquid outlet in fluid communication with the chamber and disposed at the outlet end of the chamber to provide a flow of the liquid separated from the fluid mixture; and
   a channel on the surface of the chamber wall to conduct the liquid to the liquid outlet.

2. The gas liquid separator of claim 1 wherein the channel comprises a bend along the surface of the chamber wall.

3. The gas liquid separator of claim 1 wherein a shape of the chamber is a truncated cone.

4. The gas liquid separator of claim 1 wherein a shape of the chamber cross-section is a parallelogram.

5. The gas liquid separator of claim 1 wherein a shape of the cross-section is a circle.

6. The gas liquid separator of claim 1 wherein the chamber wall includes a proximal end plate, a distal end plate and a side wall that extends between the proximal and distal end plates, and wherein the channel is on the side wall and extends from the proximal end plate to the distal end plate.

7. The gas liquid separator of claim 6 wherein the side wall is formed from a sheet metal.

* * * * *